US008560515B2

(12) United States Patent
Kimchi et al.

(10) Patent No.: US 8,560,515 B2
(45) Date of Patent: Oct. 15, 2013

(54) AUTOMATIC GENERATION OF MARKERS BASED ON SOCIAL INTERACTION

(75) Inventors: Gur Kimchi, Bellevue, WA (US); Stephen L. Lawler, Redmond, WA (US); Blaise H. Aguera y Arcas, Seattle, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 12/414,849

(22) Filed: Mar. 31, 2009

(65) Prior Publication Data

US 2010/0251169 A1 Sep. 30, 2010

(51) Int. Cl.
*G06F 7/00* (2006.01)
*G06F 17/30* (2006.01)

(52) U.S. Cl.
USPC .......................................... 707/708; 707/732

(58) Field of Classification Search
USPC .................. 707/721–725, 732–734, 708
See application file for complete search history.

(56) References Cited

U.S. PATENT DOCUMENTS

| | | | |
|---|---|---|---|
| 6,182,113 B1 * | 1/2001 | Narayanaswami | 709/203 |
| 6,587,895 B1 | 7/2003 | Golovchinsky | |
| 6,631,496 B1 * | 10/2003 | Li et al. | 715/200 |
| 6,819,267 B1 * | 11/2004 | Edmark et al. | 340/988 |
| 7,016,855 B2 | 3/2006 | Eaton | |
| 2005/0009573 A1 * | 1/2005 | Tokkonen | 455/567 |
| 2007/0198281 A1 | 8/2007 | Abernethy | |
| 2007/0220174 A1 | 9/2007 | Abhyanker | |
| 2008/0086458 A1 | 4/2008 | Robinson | |

FOREIGN PATENT DOCUMENTS

WO 2007139342 12/2007

OTHER PUBLICATIONS

Evangelou, Christina E. and Ioannis Kompatsiaris, "Exploiting Social Software to Semantically Enrich Multimedia Content for Online Communities," Proceedings of the 2nd International Workshop on Building Technology Enhanced Learning solutions for Communities of Practice, published online at [http://ftp.informatik.rwth-aachen.de/Publications/CEUR-WS/Vol-308/paper07.pdf], retrieved on Jan. 21, 2009.

Graham, Robert, et al., "Plurality: A Context-Aware Personalized Tagging System," WWW 2008, Apr. 21-25, 2008, Beijing, China. Published online at [http://www2008.org/papers/pdf/p1165-graham.pdf], retrieved on Jan. 21, 2009.

(Continued)

*Primary Examiner* — Vincent F Boccio
(74) *Attorney, Agent, or Firm* — Shook, Hardy & Bacon L.L.P.

(57) ABSTRACT

Aspects relate to observing various activities, interactions, behaviors, and other factors associated with a data exchange and creating one or more markers based on significant details associated with the observance. The one or more markers are retained and selectively rendered as a function of one or more conditions that should be satisfied before the marker is presented to the user. Some markers can contain parameters that should be satisfied in order for the marker to be considered complete. If a parameter is not satisfied, subsequent markers can be created as a function of the rendered marker. The subsequent markers can be rendered when a condition associated with the subsequent marker is satisfied.

19 Claims, 10 Drawing Sheets

(56) References Cited

OTHER PUBLICATIONS

Geven, Arjan, et al., "Presenting a Speech-based Mobile Reminder System," published online at [http://www.fp7-hermes.eu/uploads/media/publications/Geven_HERMES_SIMPE2008.pdf], retrieved on Jan. 21, 2009.

Gonzalez, David Sainz, et al., "W3C Workshop on the Future of Social Networking," published online at [http://www.w3.org/2008/09/msnws/papers/telefonica.pdf], retrieved on Jan. 21, 2009.

Madan, Anmol and Alex Pentland, "VibeFones: Socially Aware Mobile Phones," published online at [http://web.media.mit.edu/~anmol/iswc.pdf], retrieved on Jan. 21, 2009.

Kargl, Frank, et al., "Smart Reminder—Personal Assistance in a Mobile Computing Environment," published online at [http://medien.informatik.uni-ulm.de/forschung/publikationen/cscw2002.pdf], retrieved on Jan. 21, 2009.

* cited by examiner

AUTOMATIC GENERATION OF MARKERS BASED ON SOCIAL INTERACTION

BACKGROUND

Since the development and commercial access to Global Positioning System (GPS) and other Global Navigation Satellite Systems (GNSS), as well as various other Location-Based Services (LBS), numerous computer applications have been built around understanding a user's location, and leveraging that location knowledge, often in connection with a stated destination or near-by points of potential interest. For example, GPS navigation systems were first utilized in connection with two-dimensional orthographic projection maps to assist users to travel from location to location. GPS (or other LBS systems) have expanded to assist in discovering and delivering general information about a user's current location, and can include information about local business listings, advertisements, and so forth.

Given a user's location, conventional devices can provide directions to specific locations and, in some cases, can allow users to discover services or content relevant to their current location. Such services can even be helpful at a street-level scale. However, current systems and methods for understanding the location of a user do not provide the granularity to understand a real context of a user.

Further, many people prefer to communicate with others through various devices (e.g., mobile phone, computer, and so on) instead of (or as a supplement to) conducting face-to-face communications. Since communication devices are readily available, usage of these devices occurs at any time and any place. Thus, there is a vast amount of data accessible to a device as it relates to the device user. However, conventional systems do not exploit this information in a manner that can be of benefit to the user.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more features and corresponding disclosure thereof, various aspects are described in connection with providing automatic generation of markers based on data exchanges. The markers can be placed in an appropriate portion or location of a calendar, a map, or another location (e.g., task list). Further, included in the markers can be information related to participants of the data exchange, which can be determined based on contact information or other information (e.g., recognition techniques).

In accordance with some aspects, a marker can be output to a user and the subsequent actions and/or interactions of the user can be captured. Based on these captured observations, a marker that was previously output can be utilized to generate one or more other markers automatically. In accordance with some aspects, one or more of the other markers can be automatically generated as a function of a geographic location of the device (and device user) where consumption of the first marker occurs.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Figure 1:
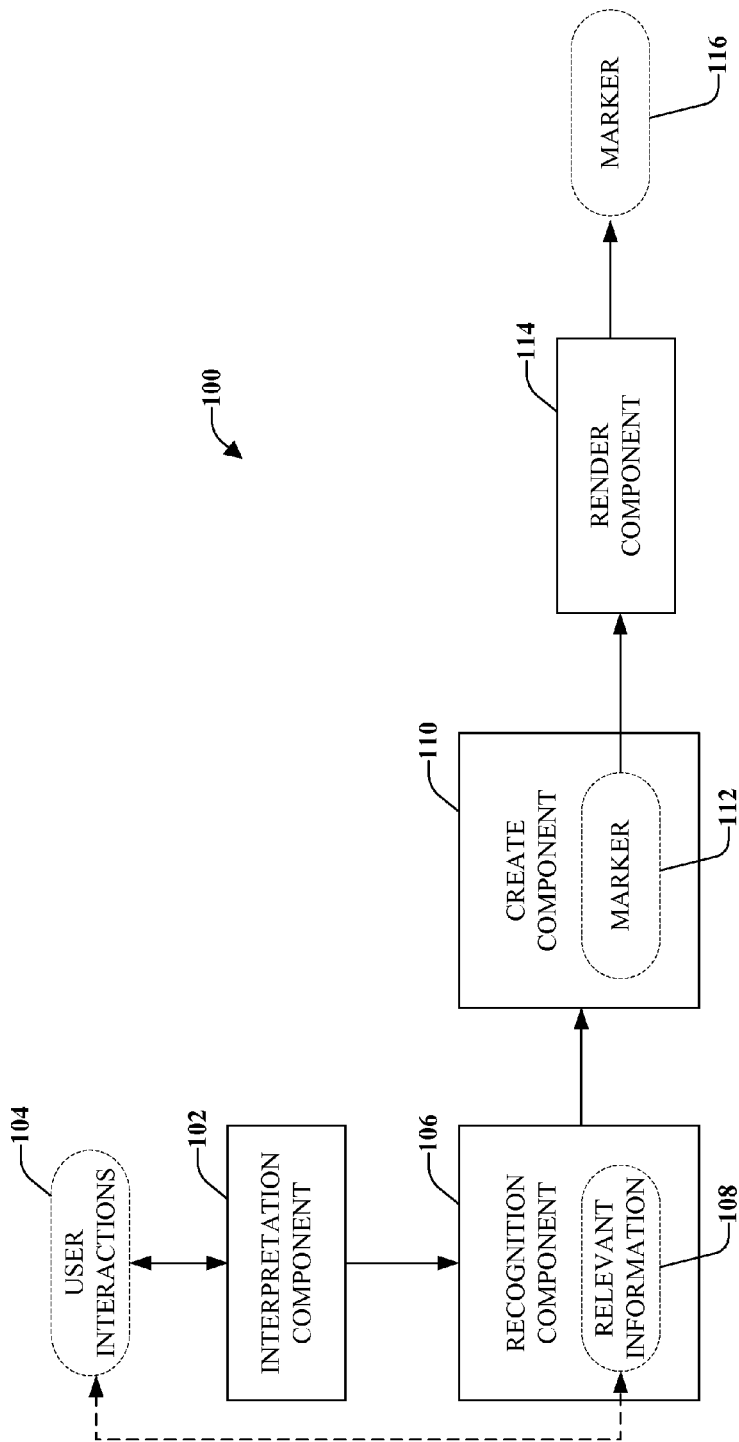
FIG. 1 illustrates a system for automatic generation of markers based on social interaction, according to an aspect.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Computing systems employing automated learning and reasoning procedures (e.g., the use of explicitly and/or implicitly trained statistical classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, and the like, and/or may not include all of the components, modules, and the like, discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring initially to FIG. 1, illustrated is a system 100 for automatic generation of markers based on social interaction, according to an aspect. As utilized herein a "marker" refers to any information, data, advertisement, photograph, drawing, sensation, fragrance, hyper-link, index to a database, comments, ratings, threaded conversations, and/or other content that can be perceived (e.g., visual, audible, tactile, and so forth). Markers can be personalized markers intended specifically for a user (e.g., a message from a friend) and/or generic markers (e.g., an advertisement intended for persons that are near the advertiser's business). According to some aspects, markers can be conditional such that the marker can be seen only from certain directions, zoom level, specific activity of the user that conforms to a profile of the marker. In accordance with some aspects, markers can be associated with geographic coordinates and/or applied to a mapping application, driving directions, and/or other location based applications. Markers can be associated with calendar events, according to some aspects.

System 100 can be included, at least partially, in a user device (e.g., computer, phone, or other computing device), which can be wired and/or wireless. The user device can be carried by the user (e.g., hand, pocket, purse, and so on) or by a vehicle associated with the user (e.g., bicycle, automobile, motorcycle, boat, or through other manners of transportation).

System 100 can be configured to generate markers automatically as a function of data exchanges. For example, as a user is engaged in a conversation, system 100 can listen (e.g., through audio techniques) to the conversation and detect key points (e.g., times, places, dates, people, names, and so forth). Based on this detection, a marker (or multiple markers) can be placed in relevant portions of an electronic calendar, an electronic map, or another location (e.g., task list, email, spreadsheet, and so forth). For example, if the user and a friend are discussing going to the movies on Friday at 2:00 in the afternoon, the terms "Friday" and "2:00 in the afternoon" can be recognized and one or more markers can be automatically placed in the user's electronic calendar. Further, the marker can include information related to the other person engaged in the conversation, which can be determined based on contact information (e.g., phone number, buddy list, and so forth) and/or based on other information (e.g., information supplied by the other user, information that system 100 automatically discovered about the other user, and so forth). In accordance with some aspects, a separate marker can be placed in the friend's calendar.

In accordance with some aspects, markers can be generated based on events that affect the user. For example, news streams can be captured automatically by system and filtered based on the user's needs. If appropriate, the news streams can be utilized to generate markers and output the generated markers at an appropriate time. Further, traffic conditions, global events, weather conditions, and so forth, can be utilized to automatically create and output markers for consumption by the user.

Included in system 100 is an interpretation component 102 that is configured to monitor user interactions 104. These interactions can relate to communications the user has with other people (and/or entities) and can occur though utilization of a user device (e.g., the user conducts a voice call with the user device, text messages are exchanged through an interface associated with user device, and so forth). In accordance with some aspects, the communication can occur in the vicinity of user device, but not through utilization of user device. For example, user device can be on a table, in the user's pocket or purse, or in another location that is in close proximity to the location where the communication is occurring such that user device can detect the interaction. Based on the detection, markers can be created, provided the marker is of benefit to the user, which can be based on user preferences, historical user information, and other criteria.

Various techniques can be utilized to observe and gather information related to user interactions 104. For example, audio input devices can be utilized to capture verbal exchanges. Alternatively or additionally, image recording and/or capturing devices can be utilized to capture gestures made by the owner of user device and/or gestures made by others in close proximity to the device (e.g., someone with whom the owner is conversing). Further, image capturing devices can be utilized to gather information associated with a communication exchange (e.g., photographs, documents, locations, and so forth). Alternatively or additionally, GPS, accelerators, barometer, compass, and other sensors can be utilized to provide context to a situation. For example, the user is driving and might not be interested in data that might interest a pedestrian (e.g., needs a place to rest), thus, certain markers might not be created based on the context information.

A recognition component 106 is configured to distinguish relevant information 108 associated with user interactions 104. Relevant information 108 is distinguished from other (e.g., non-relevant information) based on various criteria, such as whether the information is a reference to an entity, a place, a time, and/or other distinguishing characteristics.

Alternatively or additionally, relevant information 108 can be audio clips, video clips, symbols, pictures, and so forth, depending on the type of user interaction 104. For example, if the user is communicating with another entity though a text exchange (rather than a verbal communication) pictures, symbols, and other information can be conveyed that provide relevant information 108. The non-relevant information can relate to general information that can be exchanged (e.g., general conversations).

The relevant information 108 can be distinguished from non-relevant information based on key words and/or key phrases and can be associated with a time, a place, or a person and/or entity (e.g., store, coffee shop, place of business, landmark, address, geographic coordinates, and so on). In accordance with some aspects, relevant information 108 can be associated with multiple times, multiple places, and/or multiple people. Alternatively or additionally, configurable rules and/or configurable policies can be established to recognize the relevant information in various contexts. In accordance with some aspects, relevant information can be determined based on historical user information (e.g., what has the user historically considered relevant information. In another aspect, relevant information can be determined based on user defined criteria, which can be changed as user interests change.

Based on relevant information 108, a create component 110 automatically generates a marker 112. The marker 112 can be placed in a mapping application, a calendar application, or another program (e.g., task list, email, spreadsheet, and so forth). The generated marker 112 is selectively output by a render component 114. The marker can be output (as illustrated by marker 116) in any perceivable format (e.g., visual, audio, tactile, and so on). Various criteria can be utilized by render component 114 to determine when to output a marker and/or whether to output multiple markers. Examples of criteria that can be utilized include a time associated with the marker (e.g., 2:00 in the afternoon), proximity of a person (e.g., a friend), arriving at a location (e.g., a movie theater), as well as other criteria (e.g., detection of relevant information that triggers the output of a marker).

According to some aspects, radius of effect of the marker can be taken into consideration to determine how to render a marker. Considerations can include whether the marker should be revealed only to people in close proximity to the marker or whether the marker should be revealed on a global scale. Assessment of the radius can be ascertained, for example, by the manner in which the marker was generated, such as the level of zoom of a map application, by the distance of an annotator from the place, and so forth.

Thus, system 100 can transformation information from a data exchange and present users with automatically generated markers when it is deemed appropriate to output the marker based on various criteria associated with the user and/or the user context (e.g., location, time, and so on). In this manner, the vast amount of data that can be collected by a device is utilized in a manner that provides benefits to the user in the form of time savings (e.g., by not having to remember (or take the time) to create makers) and efficiency (e.g., receiving marker information when it is appropriate to act on the marker). Further, the marker can be output at an appropriate time for the user to benefit from the marker.

Figure 2:
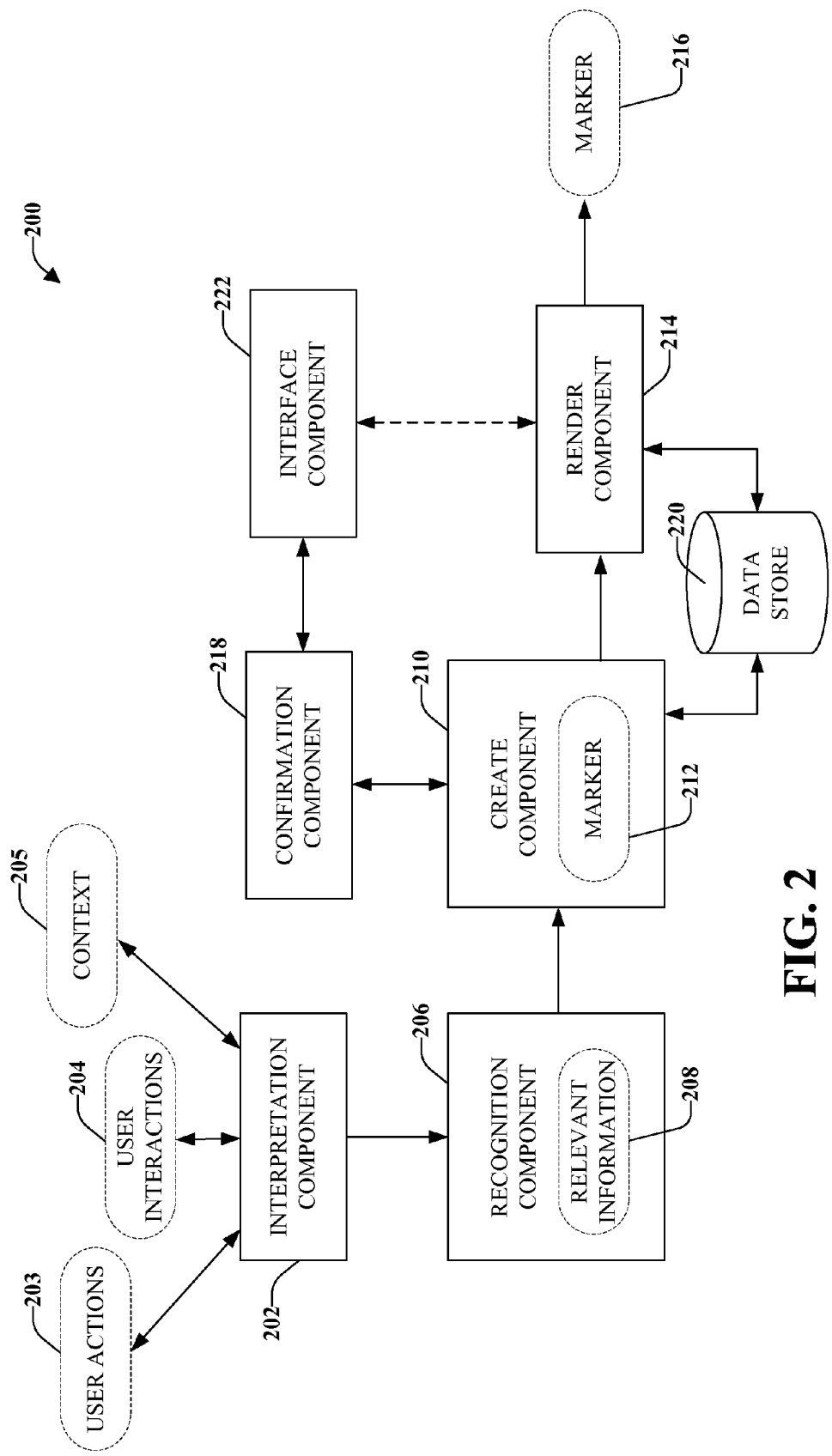
FIG. 2 illustrates a system that automatically generates markers as a function of user interactions, actions, and context according to the various aspects presented herein.

FIG. 2 illustrates a system 200 that automatically generates markers as a function of user interactions, context, and actions. Included in system 200 is an interpretation component 202 that observes and gathers user actions 203, user interactions 204, and/or user context 205. A recognition component 206 parses the relevant information 208 associated with the interactions 204 and/or actions 205. The relevant information 208 can relate to details associated with a time, a place, a person, an event, or combinations thereof. Further, the relevant information can be details associated with multiple times, places, people, and/or events. Interpretation component 202 can continuously observe and gather the actions 203, interactions 204 and/or context 205 or can simply observe and gather the actions 203, interactions 204 and/or context 205 based on certain triggering events (e.g., request by user to capture something), an external event (e.g., detection of the presence of a person), arrival at a geographic location, and so forth.

Based on relevant information 208, a create component 210 generates a marker 212, which can be any type of information, data, picture, and so forth. The marker 212 is generated with the intent that the marker 212 will assist the user, at some point, in remembering a fact, attending an appointment, performing a task, or performing other functions. The marker 212 is presented by render component 214 (as illustrated by marker 216).

In accordance with some aspects, a confirmation component 218 is configured to convey information related to the automatically generated marker 212 for confirmation or acceptance (or non-acceptance) of the marker 212. Confirmation component 218 can prompt for acceptance or non-acceptance of the marker. For example, content of the automatically generated marker 212 can be presented to the user before the marker 212 is saved in a retrievable format, such as in a data store 220. A request for confirmation can be sent for all automatically generated markers 212, a subset of markers 212 (as defined by configurable rules and/or policies), or for no markers (e.g., a confirmation request is not sent). In accordance with some aspects, the user can selectively edit the marker 212 at any time (e.g., substantially the same time as the marker 212 is automatically generated or at a different time).

Data store 220 is intended to be a repository of all or portions of markers, sets of markers, or other information described herein and/or suitable for use with the disclosed aspects. Data store 220 can be centralized, either remotely or locally cached, or distributed, potentially across multiple devices and/or schemas. Furthermore, data store 220 can be embodied as substantially any type of memory, including but not limited to volatile or non-volatile, sequential access, structured access, or random access and so on. It should be understood that all or portions of data store 200 can be included in system 200 or can in part or entirely remotely from system 200. Further, data store 220 can be accessed by any system component.

A user can respond to the confirmation request through interaction with an interface component 222. If the marker 212 is acceptable, the user can confirm the marker 212, which can be presented to the user again at an appropriate time as determined by content of the marker 212 or metadata associated with the marker 212. An appropriate time can be when the user in at (or near) a specified geographic location, a current day/time, or based on other factors (e.g., user is in contact with a particular user, detection of relevant information). In accordance with some aspects, if the user does not respond to the prompt requesting confirmation of the marker 212, the inaction can be deemed to be acceptance (or non-acceptance) of the marker 212, as determined by configurable settings.

As illustrated, interface component 222 and render component 214 can be separate components. However, in accordance with some aspects, interface component 222 and render component 214 can be the same component. Interface component 220 can provide a graphical user interface (GUI), a command line interface, a speech interface, Natural Language text interface, and the like. For example, a GUI can be rendered that provides a user with a region or means to load, import, select, read, and so forth, the one or more markers and information contained therein, and can include a region to present the results of such (e.g., confirmation of the marker, denial of the marker, modifications to the marker, and so forth). These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. For example, the user can interact with the interface component 222 by entering the information (e.g., accept, deny, modify content) into an edit control.

The user can also interact with the regions to select and provide information through various devices such as a mouse, a roller ball, a keypad, a keyboard, a pen, gestures captured with a camera, motion sensor, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. The command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channel.

Figure 3:
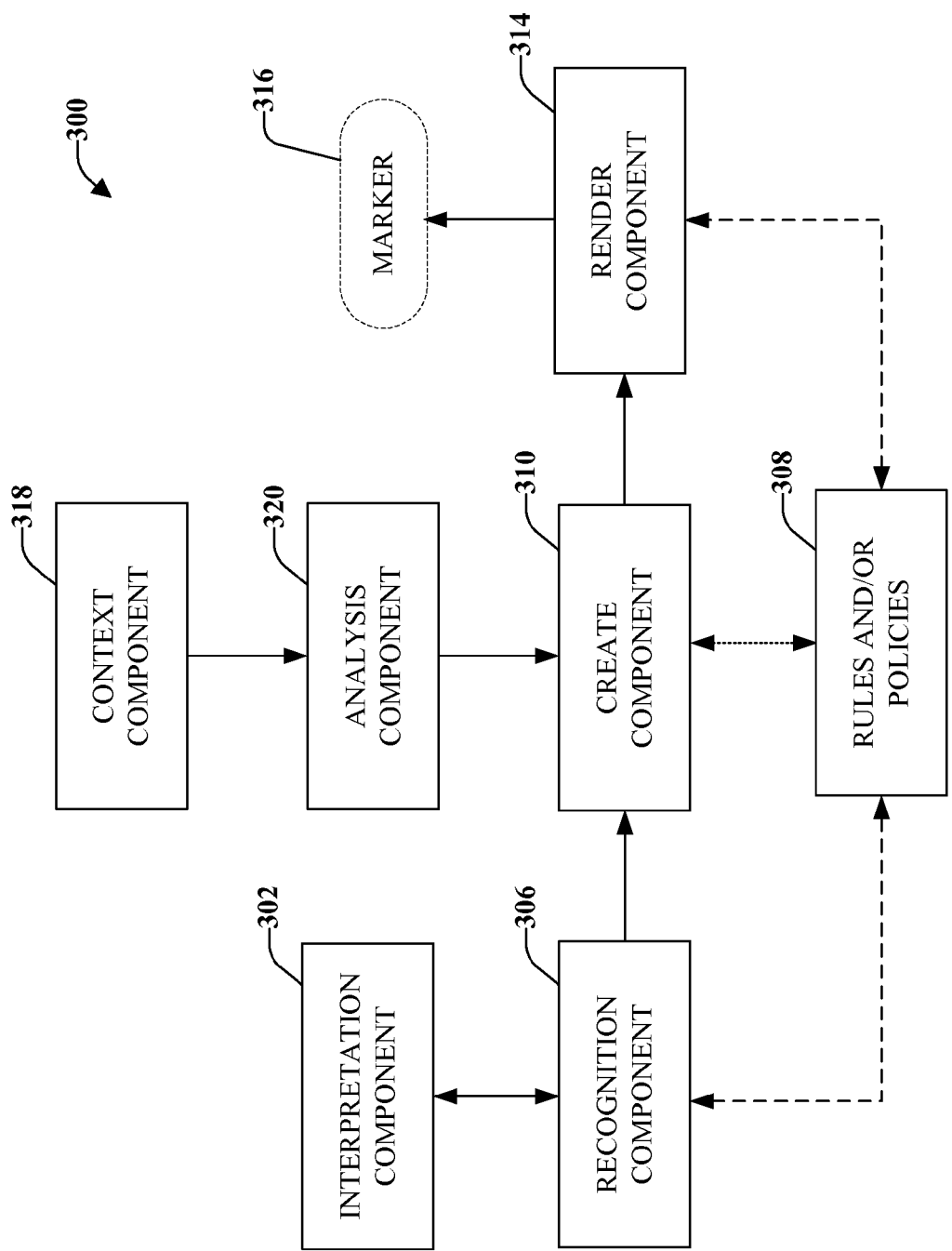
FIG. 3 illustrates a system for creation of a marker based on another marker, according to an aspect.

With reference now to FIG. 3, illustrated is a system 300 for creation of a marker based on another marker, according to an aspect. The marker from which another marker is created can relate to information that the user has created, that other users and/or entities have created for the user, automatically generated markers, and so forth. As utilized herein, "entities" refers to the Internet, another system, a computer, a commercial enterprise, and so forth and hereinafter will be commonly referred to as "user", "users", or the like. In an example, the user can create a marker for himself (or others can create the marker) to provide information and/or prompt the user about a certain item based on various criteria (e.g., user location, time, users within close proximity, and so forth). In accordance with some aspects, the markers can be generated automatically. Further, the markers can be generated manually and automatically.

Included in system 300 are an interpretation component 302 that gathers context information (e.g., data exchange, behavior, actions, interactions, context, and so forth) and a recognition component 306 that parses the context information for salient content. The salient content can relate to people, places, times, symbols, picture content, video content, and/or other parameters, which can be determined based upon configurable rules and/or policies 308. For example, a configurable rule can be that salient content is any content that refers to a person, a place, and/or a time. An example of a configurable policy can be that salient content is any content that refers to a person, a place, and/or a time except for "x" person, "y" place, and/or "x" time (or other considerations).

Based on the salient information, create component 310 automatically generates a marker. The marker can include information as to when the marker was created (e.g., date time), the circumstances when the marker was created (e.g., the gathered interactions, the gathered actions, and so forth), as well as other related data (e.g., other people, other events, and so on). The marker can be placed in a calendar program, a task list, an email program, and so forth, for future presentation to the user. In accordance with some aspects, the automatically generated marker can be selectively presented to the user for acceptance and/or denial, which can be a function of configurable rules and/or policies 308. For example, a configurable rule can be for all markers to be confirmed prior to retention of the marker in a storage media. An example of a configurable policy can be that confirmation is not needed for makers, except for those markers associated with a certain day, person, event, and so forth.

The generated markers 316 can be automatically output by render component 314 as a function of various criteria. Examples of criteria include a current location, a current time, as well as other factors (e.g., a user in close proximity, relevant information, and so on).

After the marker 316 has been output (or at substantially the same time as the marker 316 is output), a context component 318 is configured to evaluate an environment to ascertain parameters associated with the user. Context component 318 can utilize some or all of the functionality of interpretation component 302 and/or recognition component 306 in order to evaluate the environment. The environment can be evaluated to determine what behavior, actions and/or interactions, if any, were carried out by the user after the marker 316 was rendered to make a determination whether one or more subsequent markers should be created.

An analysis component 320 evaluates the salient information included in the marker and makes a determination whether another marker should be generated as follow up to the generated marker 316. The determination by analysis component 320 can be made based on the salient information and the information captured by context component 318.

For example, system 300 can capture various actions performed by device user (after perception of marker 316) and, based on the captured observations, the marker that was previously output can be utilized to automatically create one or more other markers. For example, a wife might ask her husband to pick up items (e.g., milk and eggs) from the grocery store on the way home. The husband goes to the store and purchases milk, ice cream, and potato chips. A determination that the eggs were not purchased can be made based on information contained in the original marker (e.g., milk and eggs) and observance of the husband's actions (e.g., walked right past the egg section). The first (original) marker can be utilized to generate a second marker (or more markers) that can provide information associated with the eggs, such as "Did you remember the milk and eggs?" The virtual second marker can be automatically generated as a function of the location of the husband (e.g., husband is leaving the store without eggs).

Figure 4:
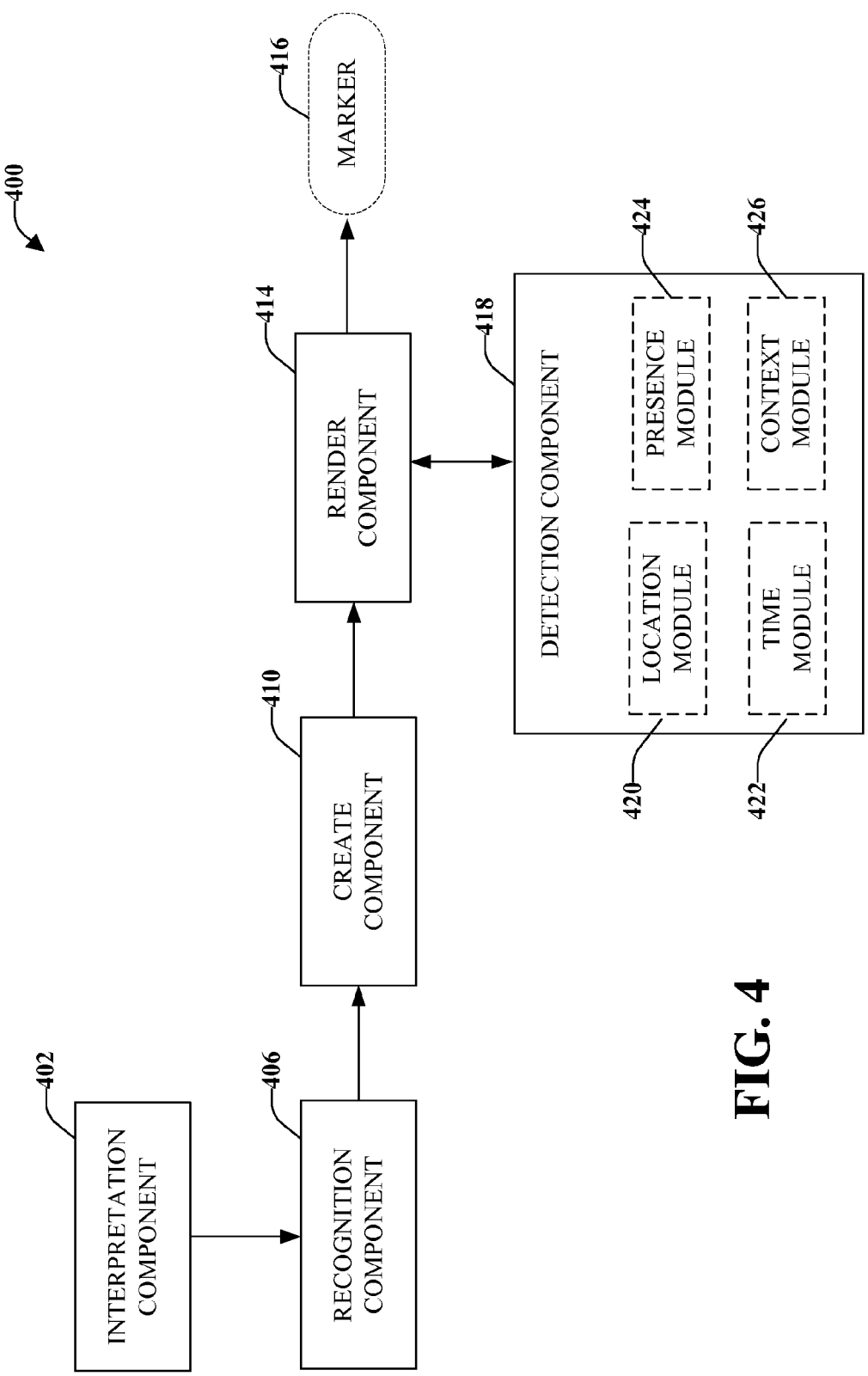
FIG. 4 illustrates a system for automatic generation and presentation of one or more markers as a function of a user environment according to the various aspects.

FIG. 4 illustrates a system 400 for automatic generation and presentation of a marker as a function of a user environment, according to an aspect. Included in system 400 is an interpretation component 402 that gathers information related to user activities and other actions (e.g., interactions, context, and so on). In accordance with some aspects, only the communication of the user (or owner) of device is captured by interpretation component 402 (e.g., a phone that only captures one side of the data exchange, through utilization of speech recognition techniques, or through other techniques for monitoring communication exchange of a single participant). According to another aspect, all sides of the data exchange are captured, provided privacy concerns of all affected parties are taken into consideration and capturing of the exchange is approved.

A recognition component 406 extracts pertinent details from the gathered information. The pertinent details can relate to people, places, and/or times, and so forth. Based on the pertinent details, a marker is created by a create component 410. A render component 414 selectively outputs the generated marker 416 at an appropriate time. To determine when to output the marker 416, render component 414 can interact with a detection component 418 that can be configured to evaluate conditions within an environment and make a determination whether the marker 416 should be output.

Detection component 418 can include various modules for evaluating the conditions. For example, detection component 418 can include a location module 420, a time module 422, a presence module 424, and/or a context module 426. However, it should be understood that various conditions other than location, time, presence, context, or combinations thereof, could be utilized to determine whether it is appropriate to render a marker, according to various aspects.

Location module 420 can be configured to determine a geographic location of system 400 (e.g., location of user device in which system 400 is (at least partially) included). The geographic location information can be utilized by render component 414 to determine whether the location information associated with the marker matches the geographic location information acknowledged by location module 420. Location can be determined by GPS technology and/or other location-based technology. For example, two (or more) people can be having a conversation, and this communication exchange is gathered by interpretation component 402. The conversation might include the phrase "I will meet you at the library at 2:00 p.m. and we can discuss the presentation there." A marker can be generated based on this data exchange. At about the same time as it is determined (by location module 420) that the user is at the library, information (e.g., key points the user wants to discuss) related to the presentation (in the form of a marker) can be selectively output so that the user has the necessary information available.

In accordance with some aspects, contradictions between markers can be detected automatically and information (in the form or a marker) presented based on the contradiction. For example, continuing the above, a conflicting marker (or appointment) can indicate that the user will be at an appointment that is an hour away at 1:30 p.m. Thus, a marker can be presented that indicates that the user will not be able to make it to the library at 2:00 p.m. Based on this, the user can immediately change her plans.

Time module 422 can be configured to determine a current time (e.g., time of day, day of week, and so forth). Time module 422 can automatically convert the time to a current time zone, such as if the user travels between time zones (e.g., flies in a plane between different geographic time zones). The current time can be utilized by render component 414 to determine whether one or more markers should be rendered.

For example, a marker might relate to a task that the user needs to perform. This marker might be automatically created when interpretation component 402 detects a communication exchange that indicates, "Remember to pick up Jimmy at 7:30." In accordance with some aspects, the communication exchange can be between the user and the user device, such as with a recording mode of the device. Recognition component 406 can recognize the key words "Jimmy" and "7:30" and, therefore, create component 410 automatically generates a marker that is to be presented to the user at 7:30 or at a different time (e.g., at 7:00). When to present the marker can be determined by historical data (e.g., how does the user historically prefer to be reminded). In accordance with some aspects, generating the marker can be based on rules (e.g., always set a reminder fifteen minutes before an appointment), based on a policy (e.g., for a personal appointment, set reminder for fifteen minutes before the start of the appointment; for a work appointment, set reminder three hours before the start of the appointment, and so forth). Time module 422 can send a current time to render component 414 (e.g., render component 414 can request notification when the time reaches (or is near) a specific time). When a current time matches or is within a range (e.g., two minutes, five minutes, and so forth) of a time specified in the marker, render component 414 can output the marker.

Presence module 424 can be configured to determine the presence of other users (or entities). The presence of the other users can be made through various techniques. For example, a discovery process can be utilized whereby devices associated with other users continuously, periodically, or based on other intervals transmit identification information, which is received by user device. In another example, the presence of other users can be made by requesting discovery information from devices within a communication range (e.g., specifically asking for the device identification information). According to some aspects, known plans for other users can be utilized (e.g., Mr. X said that he will be here today.") However, other techniques can also be utilized, such as facial recognition techniques, image recognition techniques (e.g., capturing an image of a store that the user is standing in front of and identifying the store), and so on. The presence of other users and/or other places can be utilized by render component 414 to selectively render a marker. For example, a marker might include information that is to be shared with a particular individual. When the presence of that individual is detected, the specific marker can be output so that the information is available for sharing.

Context module 426 can be configured to understand the context of the user separately and/or in combination with one or more of location, time, and/or presence. Thus, if there are external influences affecting the user (e.g., traffic congestion, weather conditions, and so forth), these external influences can be taken into consideration when markers are to be generated and/or output.

Further, previously generated markers and/or a status of previously generated markers can be changed. For example, if the user parked his car and started walking away, a marker can be created for the location of the car.

In another example, during a conversation two people discuss plans to meet at a certain location and at a certain time (e.g., "Let's see a movie at the Civic Theater this Friday. The movie starts at 5:45 p.m., so I will meet you there at 5:30 p.m."). Recognition component 418 can select the salient portions of the conversation, such as "Friday", "Civic Theater", "5:45 p.m." and "5:30 p.m.", from the above example, and one or more markers can be generated automatically (as well as manually created). When one or more of the conditions are met (e.g., time, place, and so on), a marker (or more than one marker) can be output. In accordance with some aspects, a marker can be rendered more than once, depending on an importance or an inferred importance of the marker. In such a manner, system 400 can selectively render a maker at an appropriate time in order for the user to benefit from receipt of the marker.

Figure 5:
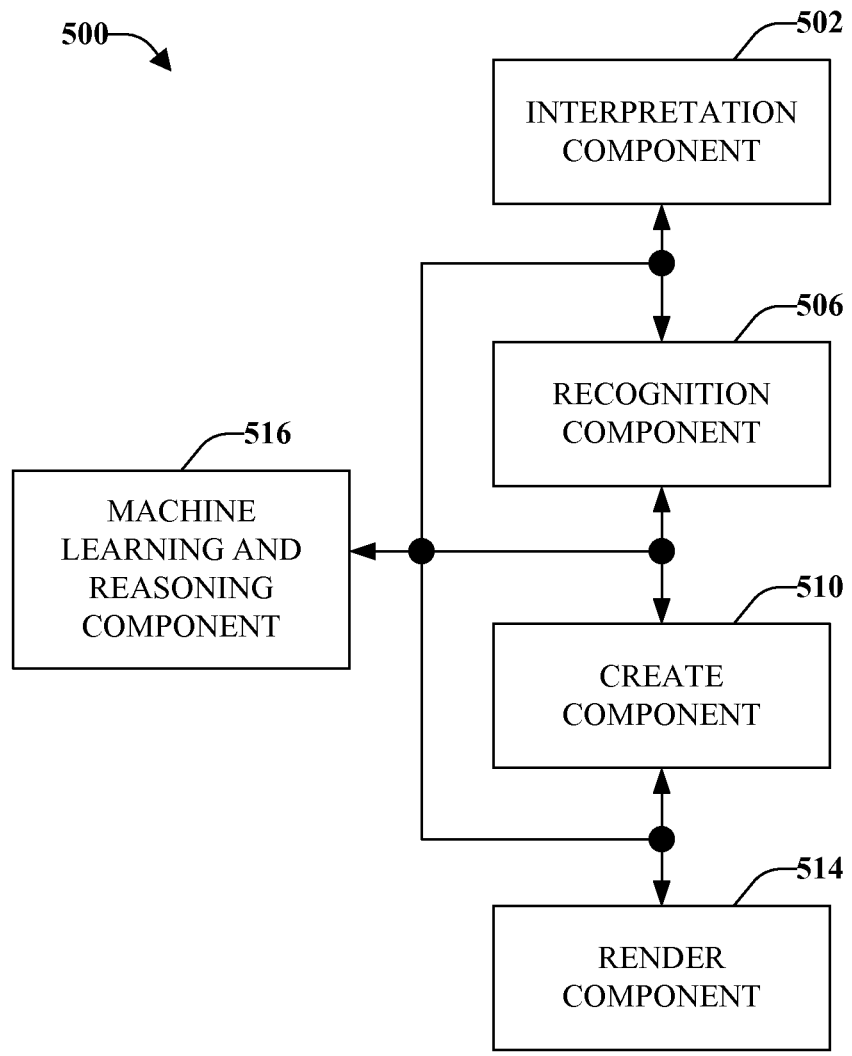
FIG. 5 illustrates a system that employs machine learning and reasoning to automate one or more features in accordance with the disclosed aspects.

FIG. 5 illustrates a system 500 that employs machine learning and reasoning to automate one or more features in accordance with the disclosed aspects. System 500 includes an interpretation component 502 that is configured to observe and gather user behavior, interactions, actions, contexts, or combinations thereof. Also included is a recognition component 506 that is configured to identify various parameters associated with the gathered information. The parameters can relate to one or more people, one or more locations, one or more times, or combinations thereof. A create component 510 is configured to analyze the parameters and create one or more markers for output by a render component 514. The marker(s) can be output when at least one condition associated with parameters of a marker is satisfied.

Also included in system 500 is a machine learning and reasoning component 516 that can employ various machine learning techniques to automatic one or more features. The machine learning and reasoning component 516 can employ principles of probabilistic and decision theoretic inference and rely on predictive models constructed through the use of machine learning procedures. Logic-centric inference can also be employed separately or in conjunction with probabilistic methods. The machine learning and reasoning component 516 can infer whether a marker should be created by obtaining knowledge about the possible actions and knowledge about what should be presented to the user based on the application, the application context, the user context, or combinations thereof. Based on this knowledge, the machine learning and reasoning component 516 can make an inference based on how users interact with marker content, how to selectively render the marker to enhance user perception of the marker, when to create a marker, the type of marker to create, or combinations thereof.

If machine learning and reasoning component 516 has uncertainty related to an observation and/or a potential marker to be generated, machine learning and reasoning component 516 can automatically engage in a short (or long) dialogue or interaction with the user (e.g., "What did you mean?", "Is this marker acceptable?", and so on). In accordance with some aspects, machine learning component 516 engages in dialogue with the user through another system component. Computations of the value of information can be employed to drive the asking of questions.

Machine learning component 516 can make an inference based on the probability that a particular user will find a particular marker useful (e.g., this user has historically derived benefit from a similar marker). If there is uncertainty, a prompt can be sent to the user for confirmation. There can be an inference based on typical user interactions (e.g., taken from a group of similarly situated users), interactions typical for this user (e.g., based on historical data), or based on other criteria (e.g., rules, policies, and so forth).

The various aspects (e.g., in connection with creating one or more markers, creating a marker as a function of a previously generated marker, selective presentation of a marker, and so forth) can employ various artificial intelligence-based schemes for carrying out various aspects thereof. For example, a process for determining if a particular marker should be provided as a notification that an action should be performed (e.g., task notification) can be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of marker generation, for example, attributes can be common behavior, a combination of actions, a pattern of interactions, and the classes are notifications that should be selectively presented to the user in the form of markers.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information, and so on). For example, SVM's are configured through a learning or training phase within a classifier constructor and feature selection module. Thus, the classifier(s) can be used to automatically learn and perform a number of functions, including but not limited to determining according to a predetermined criteria when to create a marker, the information to include in the marker, when to output the marker, whether to generate a subsequent marker, and so forth. The criteria can include, but is not limited to, similar markers, historical information, user preferences, and so forth.

Additionally or alternatively, an implementation scheme (e.g., rule) can be applied to control and/or regulate generating markers, rendering markers, and so forth. It will be appreciated that the rules-based implementation can automatically and/or dynamically generate a new and/or a subsequent marker based upon a predefined criterion. In response thereto, the rule-based implementation can automatically interpret and carry out functions associated with that marker (e.g., presentation, deletion, and so forth) by employing a predefined and/or programmed rule(s) based upon any desired criteria.

The systems disclosed herein can also include a processor and a memory that is communicatively coupled to the processor. The memory can have stored therein computer-executable instructions configured to implement a system that facilitates automatic generation of markers based on social interaction. The system includes an interpretation component that monitors a user interaction and a recognition component that distinguishes relevant information associated with the user interaction. The recognition component can distinguish the relevant information as a function of a configurable rule, a configurable policy, or combinations thereof. Also included in system is a create component that automatically generates a marker based on the relevant information and a render component that outputs the marker as a function of the relevant information. Further, included in system is a detection component that evaluates an environment for associated parameters, which include behaviors, actions, interactions, or combinations thereof. Also included is an analysis component that evaluates the relevant information and the associated parameters to ascertain completion of the marker. The create component automatically generates another marker, based on the content of the marker that was recently output, if there is no completion of the recently output marker. In accordance with some aspects, system can include a detection component that evaluations conditions that satisfy a parameter of the output marker. The parameter includes a location, a time, a presence, a context, or combinations thereof.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
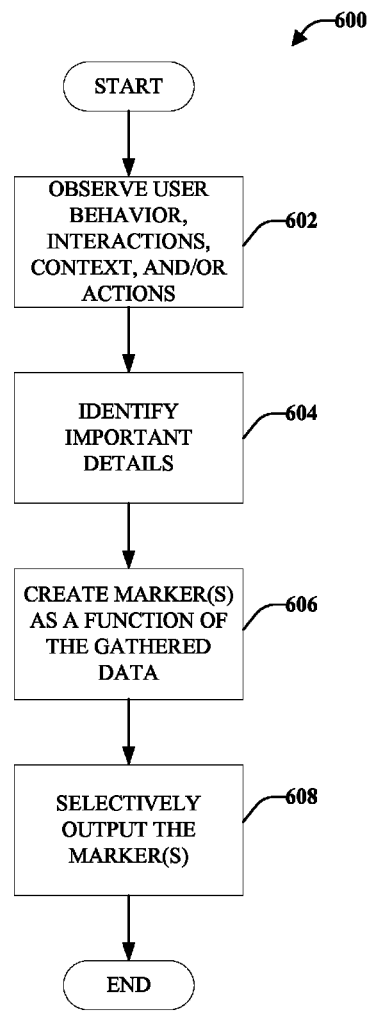
FIG. 6 illustrates a method for automatically generating markers based on data exchanges in accordance with an aspect.

FIG. 6 illustrates a method 600 for automatically generating markers based on data exchanges. Method 600 can be configured to observe and capture data that can be utilized to automatically generate a marker. The marker can be output at a later time in order for the user to benefit from the marker content.

Method 600 starts, at 602, with the observance of user behavior, interactions, contexts, and/or actions. User behavior can relate to historical information associated with the user, which can include previous markers manually configured by the user, actions of the user after creation (automatic creation and/or manual creation) of a similar marker (e.g., did the user deny, delete, or ignore the marker, and so forth). Interactions relate to data exchanges between multiple users, between a device owner and the device (e.g., in recording mode), or between the device owner and other entities, context related to environmental conditions, and so forth. Actions relates to activities performed by the user, such as gesturing at a portion of a picture, gesturing at a building, nodding in acceptance (e.g., to a meeting invitation), and so forth.

At 604, important details from the observed behavior, interactions, context, and/or actions are identified. These important details can relate to people, places, times, and so on. In accordance with some aspects, the important details are gathered based on configurable rules and/or configurable policies. For example, a user can set up rules that specify specific content that should be identified. In another example, parameters can be configured that specify that if a data exchange occurs with a supervisor, then content related to work projects and/or other work activities should be captured.

One or more markers are automatically created, at 606, as a function of the identified important details. The markers can be any type of information, data symbol, photo, and so forth that can be perceived by a user (e.g., visual, audio, tactile, and so forth). The created marker can be placed in a storage media and/or can be associated with various programs (e.g., calendar, task list, notes, memos, and so on). In accordance with some aspects, a prompt is sent to the user requesting acceptance of the marker. The user can accept, deny, modify, and/or perform other actions with the marker at substantially the same time as the marker is created or at a different time.

Figure 7:
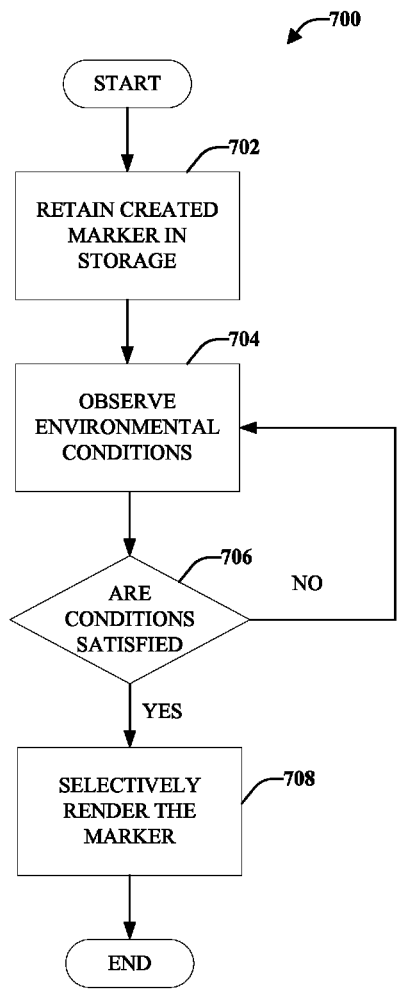
FIG. 7 illustrates a method for determining when to present a generated marker, according to an aspect.

At 608, the created marker is selectively rendered in a perceivable format. The rendering can be based on various criteria including internal factors (e.g., is the user seeking information contained in one or more markers) and/or external factors (e.g., is the presence of another user (required by the marker) detected, and so forth). Further information related to rendering a marker is illustrated and described with reference to FIG. 7, which illustrates a method 700 for determining when to present a generated marker, according to an aspect.

Method 700 starts, at 702, when an automatically generated marker is retained, such as in a computer-readable storage media. In accordance with some aspects, manually generated markers can also be retained and selectively presented as discussed herein.

At 704, environmental conditions are observed. The environmental conditions can relate to a current time of day, day of week, and so forth. Alternatively or additionally, the environmental conditions can relate to a current location (e.g., building, store, address, geographic coordinates, and so on). Further, environmental conditions can relate to the presence of another user and/or entity within a communication range and/or geographic range. In accordance with some aspects, environmental conditions can relate to specific factors within the environment that have been pre-designated by the user (e.g., through configuration of a rule and/or a policy). For example, the user might want a certain marker to be presented when a certain factor is encountered, even if that factor is not specifically identified in a marker. For example, the user might want a marker related to a scheduled vacation to be presented when a supervisor is around so that the user can remind the supervisor about scheduled vacation days.

A determination is made, at 706, if conditions associated with the marker and/or rules/policies are satisfied. This determination can be made by accessing data associated with each marker and/or rule/policy and comparing the condition with the data. In accordance with some aspects, a listing of triggering events can be made, wherein the listing correlates a condition with marker data, rule data, and/or policy data.

If the determination is that one or more conditions are satisfied ("YES"), method continues, at 708, and one or more markers, whose conditions are satisfied, are selectively rendered. The rendering of the marker(s) can be through any perceivable manner, provided the user has the opportunity to perceive the marker.

If the determination, at 706, is that the conditions are not satisfied ("NO"), method 700 continues, at 704, with the observance of environmental conditions. It is to be understood that this act can be recursive such that any number of conditions and/or markers can be observed. Further, a marker can be rendered multiple times or a single time based on marker parameters and/or environmental conditions.

Figure 8:
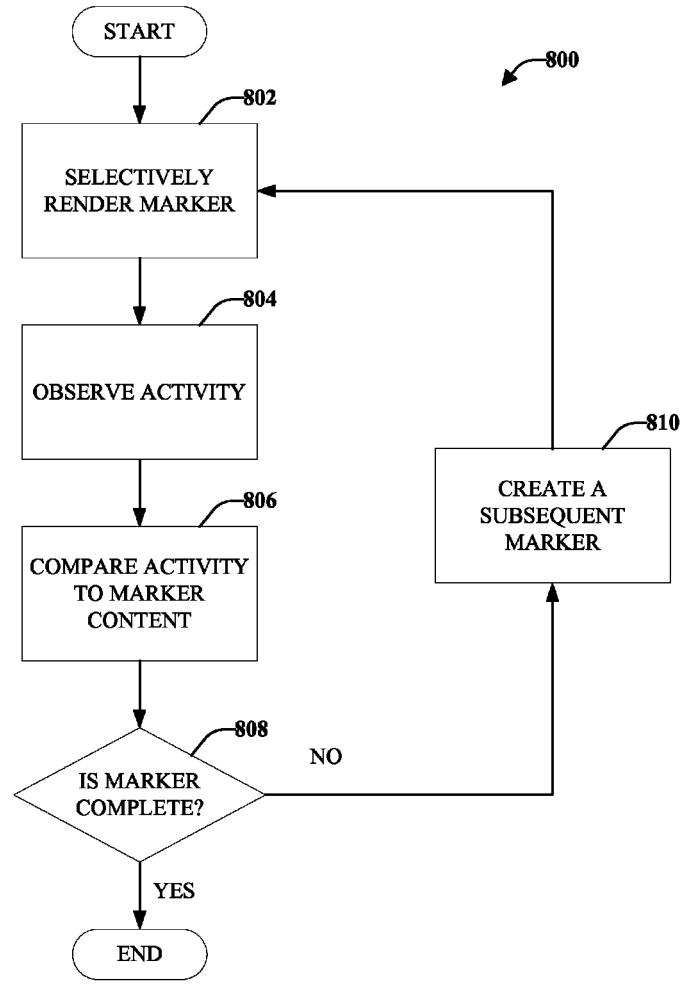
FIG. 8 illustrates a method for automatically creating a new marker based on a previously rendered marker, according to an aspect.

With reference now to FIG. 8, illustrated is a method 800 for automatically creating markers based on a previously rendered marker, according to an aspect. At 802, a marker is selectively rendered. The marker can be a marker that was generated automatically as a function of an observed data exchange between two or more users and/or entities. In accordance with some aspects, the marker is generated automatically based on a data exchange between a user and a device configured to execute method 800. Alternatively or additionally, the marker can be a manually generated marker. In accordance with some aspects, the markers can be generated automatically and/or manually.

Activity is observed, at 804. The activity can be observed for various parameters that are identified in a marker and/or that are inferred based upon marker content. The activity is compared to the marker content and/or parameters associated with the content, at 806. For example, a father might ask his son to put gasoline in the car and pick up his sister before coming home. The son picks up his sister, but forgets to put gas in the car. Thus, the activity observed can be that the sister is now in the car or that the car was at the location where the sister was located, and so on. However, it is not observed that the car has a full tank of gasoline (or it is observed that the car is low on gasoline).

A determination is made, at 808, whether the marker is complete, which can be made based on information contained in the marker (e.g., key words, actions associated with the marker, and so on). If the marker is complete ("YES"), method 800 ends. If the marker is not complete ("NO"), one or more subsequent markers are created. The subsequent markers can be created as a function of residual information contained in the previously rendered marker. Continuing the above example, a subsequent marker can be created to remind the son to get gasoline. Based on a location of a gas station that is on the way home, the subsequent marker can be selectively render as the car approaches the gas station.

In accordance with some aspects, the method can employ a processor executing computer executable instructions stored on a computer readable storage medium.

Figure 9:
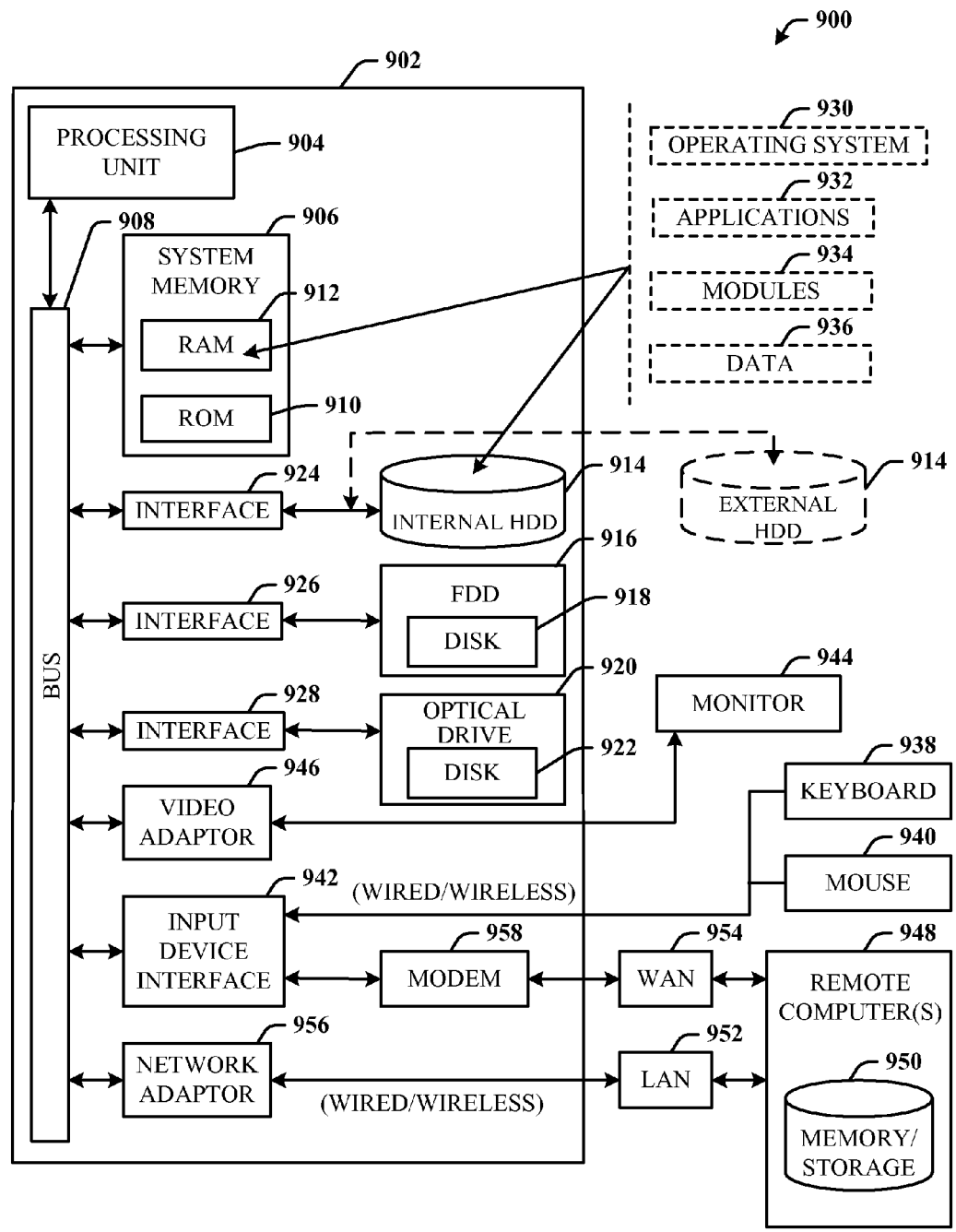
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
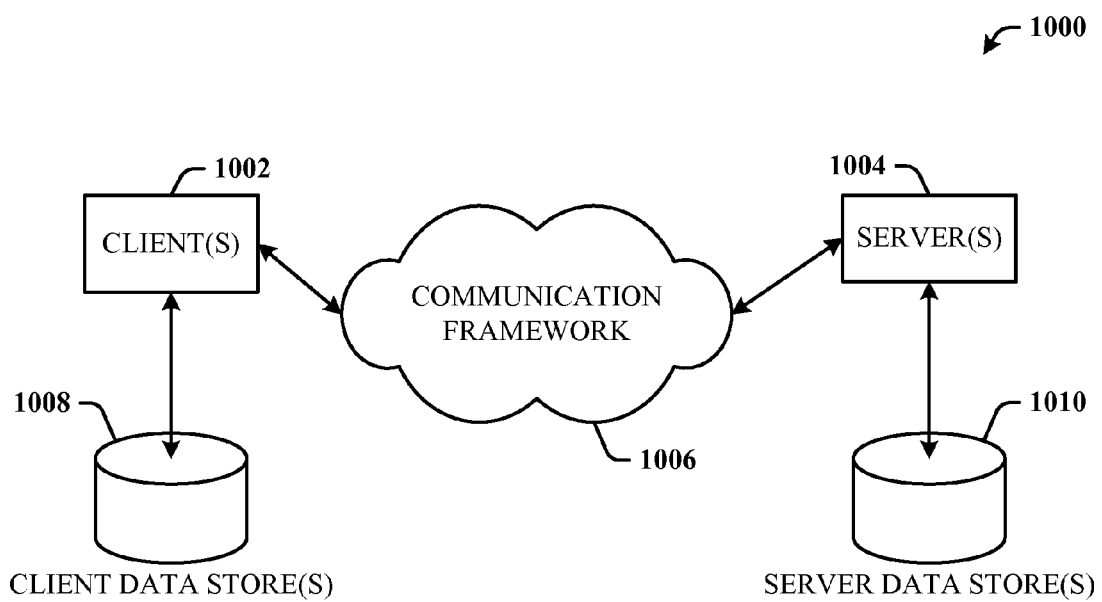
FIG. 10 illustrates a schematic block diagram of an exemplary computing environment in accordance with the various aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology (including non-radio wireless communications). The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system for facilitating an automatic generation of markers based on user interaction, the system comprising:
   a data store;
   an interpretation component that monitors data associated with a user interaction, the data comprising at least one of: a conversation, and a gesture;
   a recognition component that analyzes the data associated with the user; and
   a creation component that automatically, without input from the user, generates a marker based on the data associated with the user interaction, wherein the marker provides an indication to the user, the indication being related to the data associated with the user interaction,
   a rendering component that, automatically, without user input, outputs the marker in one or more applications, the one or more applications comprising: a calendar, a task list, a map, and an email.

2. The system of claim 1, wherein the data associated with the user further comprises at least one of: a geographic location and an electronic communication.

3. The system of claim 1, wherein the marker comprises parameters, the parameters comprising as least one of: a behavior of the user, an action the user, an interaction by the user, a location of the user, a time, a presence, or a context.

4. The system of claim 3, further comprising a confirmation component that prompts the user for acceptance or non-acceptance of the marker.

5. The system of claim 4, further comprising a detection component that determines a satisfaction of at least one of the parameters of the marker, wherein the creation component automatically generates a subsequent marker, when at least one of the one or more parameters of the marker is not satisfied.

6. The system of claim 1, wherein the recognition component analyzes the data associated with the user as a function of a configurable rule or a configurable policy.

7. The system of claim 1, wherein the marker comprises at least one of: a visual indication or an audio indication.

8. One or more computer-readable storage media having computer-executable instructions embodied thereon that, when executed, perform a computer-implemented method for automatically generating a marker, the method comprising:
   retrieving data associated with a user interaction, the data comprising at least one of: a conversation, and a gesture;
   automatically, without user input, generating a marker that corresponds to the user interaction based on analyzing the data associated with the user interaction; and
   automatically, without user input, rendering the marker in one or more applications that correspond to the user interaction, the one or more applications comprising: a calendar, a task list, a map, and an email.
   wherein the marker provides an indication to the user, the indication being related to the data associated with the user interaction, and
   wherein the marker comprises one or more parameters.

9. The media of claim 8, wherein the method further comprises determining that at least one of the one or more parameters is satisfied; and rendering the marker upon determining that at least one of the one or more parameters is satisfied.

10. The media of claim 8, wherein the data associated with the user further comprises at least one of: a geographic location and an electronic communication.

11. The media of claim 8, wherein the one or more parameters comprises as least one of: a behavior of the user, an action the user, an interaction by the user, a location of the user, a time, a presence, or a context.

12. The media of claim 8, the method further comprising:
   analyzing at least one of the one or more parameters and subsequent data associated with the user;
   determining that at least one of the one or more parameters is not satisfied; and
   generating at least one subsequent marker.

13. The media of claim 12, wherein the method further comprises rendering the at least one subsequent marker.

14. The media of claim 8, wherein the analyzing the data associated with the user interaction is based on a configurable rule or a configurable policy.

15. The media of claim 8, wherein the marker comprises at least one of: a visual indication or an audio indication.

16. One or more computer-readable storage media having computer-executable instructions embodied thereon that, when executed, perform a computer-implemented method for automatically generating a marker, the method comprising:
- retrieving data associated with a user interaction, the data associated with the user interaction comprising at least one of: a conversation, and a gesture;
- automatically, without user input, generating a marker that corresponds to the user interaction, wherein the marker provides an indication to the user, the indication being related to the data associated with the user interaction, and wherein the marker comprises one or more parameters;
- automatically, without user input, rendering the marker in one or more applications that correspond to the user interaction, the one or more applications comprising: a calendar, a task list, a map, and an email;
- determining that at least one of the one or more parameters is not satisfied based on analyzing the at least one of the one or more parameters and data associated with a subsequent user interaction, the data associated with the subsequent user interaction comprising at least one of: a conversation and a gesture;
- automatically, without user input, generating one or more subsequent markers based on the data associated with the subsequent user interaction; and
- automatically, without user input, rendering the one or more subsequent markers.

17. The media of claim 16, wherein the data associated with the user further comprises at least one of: a geographic location and an electronic communication.

18. The media of claim 16, wherein the one or more parameters comprise as least one of: a behavior of the user, an action the user, an interaction by the user, a location of the user, a time, a presence, or a context.

19. The media of claim 16, the method further comprising prompting a user for acceptance of the marker or the one or more subsequent markers; and retaining the marker or the one or more subsequent markers for later rendering.

* * * * *